US009159187B2

(12) United States Patent
Thackston

(10) Patent No.: US 9,159,187 B2
(45) Date of Patent: Oct. 13, 2015

(54) SYSTEM AND METHOD FOR VERIFYING USER IDENTITY IN A VIRTUAL ENVIRONMENT

(75) Inventor: James D. Thackston, Pinellas Park, FL (US)

(73) Assignee: Concierge Holdings, Inc., Pinellas Park, FL (US)

( * ) Notice: Subject to any disclaimer, the term of this patent is extended or adjusted under 35 U.S.C. 154(b) by 0 days.

(21) Appl. No.: 13/303,667

(22) Filed: Nov. 23, 2011

(65) Prior Publication Data

US 2012/0129596 A1 May 24, 2012

Related U.S. Application Data

(60) Provisional application No. 61/416,526, filed on Nov. 23, 2010.

(51) Int. Cl.
*G06F 21/00* (2013.01)
*G07F 17/32* (2006.01)

(52) U.S. Cl.
CPC .................................. *G07F 17/3206* (2013.01)

(58) Field of Classification Search
CPC ................................................ G06Q 20/40145
USPC ........................................................... 705/50
See application file for complete search history.

(56) References Cited

U.S. PATENT DOCUMENTS

| | | | | |
|---|---|---|---|---|
| 6,084,967 | A * | 7/2000 | Kennedy et al. | 380/247 |
| 6,142,876 | A * | 11/2000 | Cumbers | 463/25 |
| 6,181,803 | B1 * | 1/2001 | Davis | 382/115 |
| 7,849,619 | B2 * | 12/2010 | Mosher et al. | 40/633 |
| 2002/0129285 | A1 * | 9/2002 | Kuwata et al. | 713/202 |
| 2003/0070080 | A1 * | 4/2003 | Rosen | 713/187 |
| 2005/0229007 | A1 * | 10/2005 | Bolle et al. | 713/186 |
| 2007/0198712 | A1 * | 8/2007 | Mani et al. | 709/225 |
| 2008/0065895 | A1 * | 3/2008 | Liu et al. | 713/176 |
| 2009/0325606 | A1 * | 12/2009 | Farris | 455/456.3 |
| 2010/0145854 | A1 * | 6/2010 | Messerges et al. | 705/44 |
| 2012/0173434 | A1 * | 7/2012 | Mardikar et al. | 705/67 |
| 2013/0005486 | A1 * | 1/2013 | Amaitis et al. | 463/42 |

* cited by examiner

*Primary Examiner* — Charles C Agwumezie
(74) *Attorney, Agent, or Firm* — Kilpatrick Townsend & Stockton LLP

(57) ABSTRACT

Systems and methods for verifying user identity in a virtual environment are provided that may include periodic transmitting/monitoring of biometric data and geographic location data. Integrated systems may include anti-tamper devices that automatically delete biometric data in the event if tampering and/or power loss. Thus, the present invention helps to prevent tampering with player identity information, as well as helping to prevent access by a player to the software, graphics or other content associated with selected online activities. Such systems and methods may find particular applicability in fields related to online gambling by verifying the identity and location of an on-line player.

17 Claims, 7 Drawing Sheets

SYSTEM AND METHOD FOR VERIFYING USER IDENTITY IN A VIRTUAL ENVIRONMENT

BACKGROUND OF THE INVENTION

The ability of criminals and cyber-terrorists to infiltrate supposedly well-defended computer networks is well known. In order to successfully breach cyber defenses, criminals or terrorists must execute actions against computer hardware and software that is typically under the complete control of third parties which may include innocent individuals, businesses, or government agencies. As a result, billions of dollars are spent on necessary countermeasures.

The present invention seeks to solve a less widely recognized problem inherent in online activities such as those that involve wagering, and other transfers of funds between individuals, such as may occur in online versions of poker, etc.

By way of example, in internet poker, 2 to 10 people typically play each other across a 'virtual' poker table. The game is managed from servers operated by an internet poker service provider (or 'poker website'). The poker website manages communications to and from remote computers that are under the near complete control of the players. It is on the graphical displays of these remote computers that the virtual poker table, avatars for other players, and card graphics are made visible to the player. For innocent players the fact that they control their own computers is of no consequence. But if the 'player' as known to the poker website and its regulators is a 'money mule' paid by a terror or crime organization (TCO), a significant vulnerability is apparent. A 'money mule' is a person hired by a TCO for his or her unblemished identity and separation from the TCO.

Contrast the problem faced by hackers trying to break into computers under the control of someone else, to that faced by a TCO hacking computers entirely under its control. Manipulation of, for example, internet poker games for the purpose of laundering money becomes astonishingly easy.

Consider a criminal enterprise (CE) seeking to offer untraceable electronic banking services to terror and crime organizations (TCOs). The CE uses technology and carefully-designed business processes to exploit the natural properties of internet poker in order to move vast sums of money among thousands of poker accounts in many different countries. The most basic operation performed by the CE is the corruption of internet poker games using 4-way collusion for the purpose of moving money from two poker accounts to two other poker accounts playing at the same virtual poker table.

Regulators in jurisdictions where internet poker is legal such as the Isle of Man, the Alderney Islands, and Gibraltar claim that by recording hand histories and the identities of the players at any virtual poker table, counter-terrorism investigators can determine connections between donors and recipients. They also claim that it is possible to determine the physical location (geo-location) of an online poker player. They further claim that automated anti-collusion detection systems can reliably find instances where two or more players are sharing card values. The fact is, the CE can breach any anti-collusion or global positioning system (GPS) or internet protocol (IP) address geo-location system currently used by internet poker websites.

The following scenario illustrates just one example of how the CE might use weaknesses in the current internet poker business model to implement a large scale money laundering operation. However, it should be appreciated that the concepts described herein are applicable to a wide variety of online activities in which the actual identity and/or location of a user is needed for verification, tracking and/or monitoring purposes.

The CE business process assigns any number of 'money mule' accounts to poker games in groups of four. This means that 4 of the 9 to 10 seats at a compromised virtual poker table are CE mule accounts. The mules never actually play the games and may not even be privy to the CE's activities. Experts at CE remotely login to the mules' computers and play games under the identities of those mules. They can also transfer money to and from the mule bank accounts and read emails sent to the mules by the poker website.

For typical money transfers, two of the mule accounts are designated as donors and two are recipients. The CE 'players' use technology that allows them to see each others hole cards in an undetectable manner that does not distract from the game in any way. The players can remain focused on the game ensuring, over time, that money moves in the right direction.

Further, specially-designed software used by the CE to generate the four-player games can easily and reliably defeat any automated anti-collusion technique employed by the poker websites or their regulators. This is done by providing each mule with two low-end computers. One computer is 'clean' and the other is 'corrupt'. The clean computer runs the internet poker client software. It contains neither the hack software nor the support software for remote access systems. If regulators require GPS verification of the computer's location, then this technology is included with the clean computer. Since the clean computer does not run any illicit software and possesses the required GPS technology (if it were required), the poker client software will never detect anything suspicious thereby enabling the CE to easily overcome geo-location requirements imposed by the poker websites and their regulators.

The corrupt computer runs all hack software, remote access support software, and the software for a frame grabber that in one implementation grabs the output signal from the clean computer's SVGA port. Keyboard and mouse commands—processed using standard drivers—are sent from the corrupt computer to a clean computer's USB port.

A minimum of three critical software processes are run on the corrupt computer. The first is an encrypted, private, CE-operated communications tool. The second is the 'card clipping' software that captures an image of the player's hole cards, transmits it to the CE's server, and retrieves the images of the other three players' hole cards. A private, CE-controlled instant messaging system is built into the card clip application. The third process allows CE 'players' (AKA 'soldiers') to control the corrupt and clean computers from anywhere in the world—again in an undetectable manner.

The CE uses state-of-the-art technology to manage communication among CE soldiers and the CE leadership. Soldiers can play poker on any computer located anywhere on the internet using a device called a 'remote access appliance' (e.g. Bomgar). Appliances such as the Bomgar device allow the CE to control thousands of remote computers without risking discovery by counter-terrorism investigators. By using a hardware appliance, the CE avoids using commercial remote access services such as GoToMyPC.com that could cooperate with law enforcement or counter-terrorism authorities. And, while all communications between CE leaders, soldiers, and cell leaders are undetectable, they are nonetheless encrypted and always sent via means under the complete control of the CE.

Custom server-side software is used to manage all administrative tasks such as maintaining login credentials for mule accounts, internal communications, game-in-progress data distribution, and generating and managing the games. An electronic database is used to persist data.

In one example, the CE business process starts with customer operative A hiring a money mule B. Mule B is instructed to open a conventional bank account and deposit money provided by operative A. Mule B is then instructed to open one or more internet poker accounts, using the mule's legitimate identity and bank account. The same process occurs between mule C and customer operative D in the country where the operative's money is to be transferred. Once the accounts are opened and the mules' identities are verified to the satisfaction of the poker website, mules B and C give the online logins for their bank account, the poker account(s), and email account associated with the poker websites to customer operatives A and D, respectively. Operatives A and D then send the logins to CE personnel using a privately operated, encrypted communication system. Finally, customer operatives A and D provide mules B and C with specially prepared computer hardware and software systems. Once these procedures are complete, the mules just need to keep the computers running and maintain connectivity to the internet. Mules are usually used indefinitely by the customer operatives and will likely be kept "in the dark", so they may or may not have knowledge of the CE's operations, and may or may not be paid for their services. And if A and B or C and D are compromised, law enforcement or counter-terrorism authorities will have no way of linking operatives A and D because the CE has procedures in place to alter personnel distribution and immediately relocate servers and other traceable technology.

The possibility of money laundering with internet poker presents law enforcement and counter-terrorism authorities with a dilemma. If a money mule is discovered, he or she is unlikely to know anything useful beyond possibly identifying their TCO contact. Furthermore, since the mule doesn't actually play poker, he or she will have no knowledge of the other players at the virtual poker tables. This ensures that authorities will likely bear the expense of an international investigation involving several different foreign jurisdictions.

As this scenario illustrates, current technology and regulatory schemes are not sufficient to keep TCOs from exploiting internet poker. Two innovations are required: (1) a way to remove substantial control of computer hardware and software from an internet poker player while allowing the computer equipment to remain in the possession of the player, and (2) a way to reliably confirm the player's true identity and/or physical location.

The present invention provides the required solution for internet poker and any other business process that requires similar controls.

SUMMARY OF THE INVENTION

According to first aspects of the invention, a tamper-resistant system for engaging in an online activity, while verifying the identity and/or physical location of a user, is provided. The system may include a casing, with a microprocessor and/or a memory housed in the casing.

The system may include a biometric information identification module configured to obtain, store and/or transmit biometric identification data, e.g. for one or more distinct user(s) of the system. In embodiments, the biometric information identification module may include a biometric scanner, such as, for example, a fingerprint scanner, a retina scanner, a DNA scanner, etc.

In embodiments, the microprocessor may be configured to obtain biometric identification information of the user, for example, during a configuration of the system to the user, and/or during an initiation of an online activity.

In embodiments, the user biometric identification data may include encrypted biometric reference data that is stored, for example, during an initial configuration of the system to the user. The memory may include a volatile, or non-volatile memory, for storing the encrypted biometric reference data, which may be configured to automatically erase stored data when power to the memory is reduced or lost.

In embodiments, the system may include a tamper-detection module configured to detect tampering with, for example, the casing and/or connectors of the casing. The tamper-detection module may include, for example, one or more energized anti-tamper electrical circuits that become de-energized when a switch is opened or a circuit conductor is broken in response to an attempt to open the casing, or the like.

In embodiments, the system may include a power supply, which may include, for example, a rechargeable battery. The power supply may include separate power sources for providing power to various components of the system, e.g. to the storage memory, the microprocessor and/or the tamper-detection module. In embodiments, the power source may include a rechargeable battery, separate from a main power supply, the rechargeable battery powering the anti-tamper electrical circuits and/or a memory storage device.

Embodiments may also include a controller module containing automated instructions for monitoring the status of the anti-tamper electrical circuits and for erasing user identification or other data, such as the encrypted biometric reference data, from memory when the tamper-detection module detects tampering with the system, e.g. when any one of the plurality of anti-tamper electrical circuits is de-energized, or when the power level of the rechargeable battery or other power source falls below a certain threshold.

A location module may also be provided that is configured to receive navigation signals broadcast from navigation transmitters, and/or to provide location information of the system. The location module may include, for example, a GPS receiver, GPS processing module, and/or GPS location transmitter. In embodiments, the processor is may be configured to periodically transmit location information of the system.

The system may be configured to periodically transmit biometric identification data while the user is engaging in an online activity, and to erase the user biometric identification data from memory based on, for example, a detected tampering with the casing or connectors of the casing, and/or a power deficiency from the power supply.

The system may be configured for engaging in online activities, such as online gambling, and periodically transmitting the location information of the system and/or the biometric identification data while the user is engaging in the online activity. Accordingly, if the biometric, or other pertinent data, is deleted or disturbed during the online activity, the activity may be terminated by the sponsor/host.

According to embodiments, the system may include certain non-detachable components (i.e. components that are fixedly integrated with the casing and/or monitored for continuous connection by the tamper-detection module) such as a video screen, a keyboard, a cursor control device, a volatile and/or non-volatile memory, a central processing unit, a network controller, a navigation system, and/or a biometric scanning device.

According to further aspects of the invention methods of providing a secure online service may include one or more of storing biometric reference data of a user in a database; receiving a request to provide the online service to the user;

while providing the online service to the user, periodically receiving current biometric data of the user; comparing the current biometric data of the user to the stored biometric reference data; and/or terminating the online service if (a) the current biometric data does not correspond to the stored biometric reference data, or (b) if the current biometric data is not received after a predetermined period of time.

Methods may also include receiving current location information from the user, and/or comparing the location information to predetermined geographical areas in which the online service may be provided before providing the service.

Embodiments may also include terminating the online service if the current location information changes to an area in which the online service is prohibited.

In embodiments, the online service may include transferring funds between different users, and/or the online service may include online gambling, such as online poker.

According to further aspects of the invention methods of engaging in a secure online service may include one or more of configuring a secure device to include biometric reference data of a user; sending a request from the secure device for the user to engage in the online service; while engaging in the online service, periodically sending at least one of the biometric reference data and current biometric data of the user to a service provider; and/or deleting the at least one of biometric reference data and current biometric data from the secure device if at least one of the device is tampered with and if a power source of the device falls below a required level.

Embodiments may also include sending current location information from the device when requesting the online service or while engaging in the online service.

In embodiments, the current location information may include, for example, a GPS location.

In embodiments, the online service may include transferring funds between different users, and/or the online service may include online gambling.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION OF THE INVENTION

Figure 1:
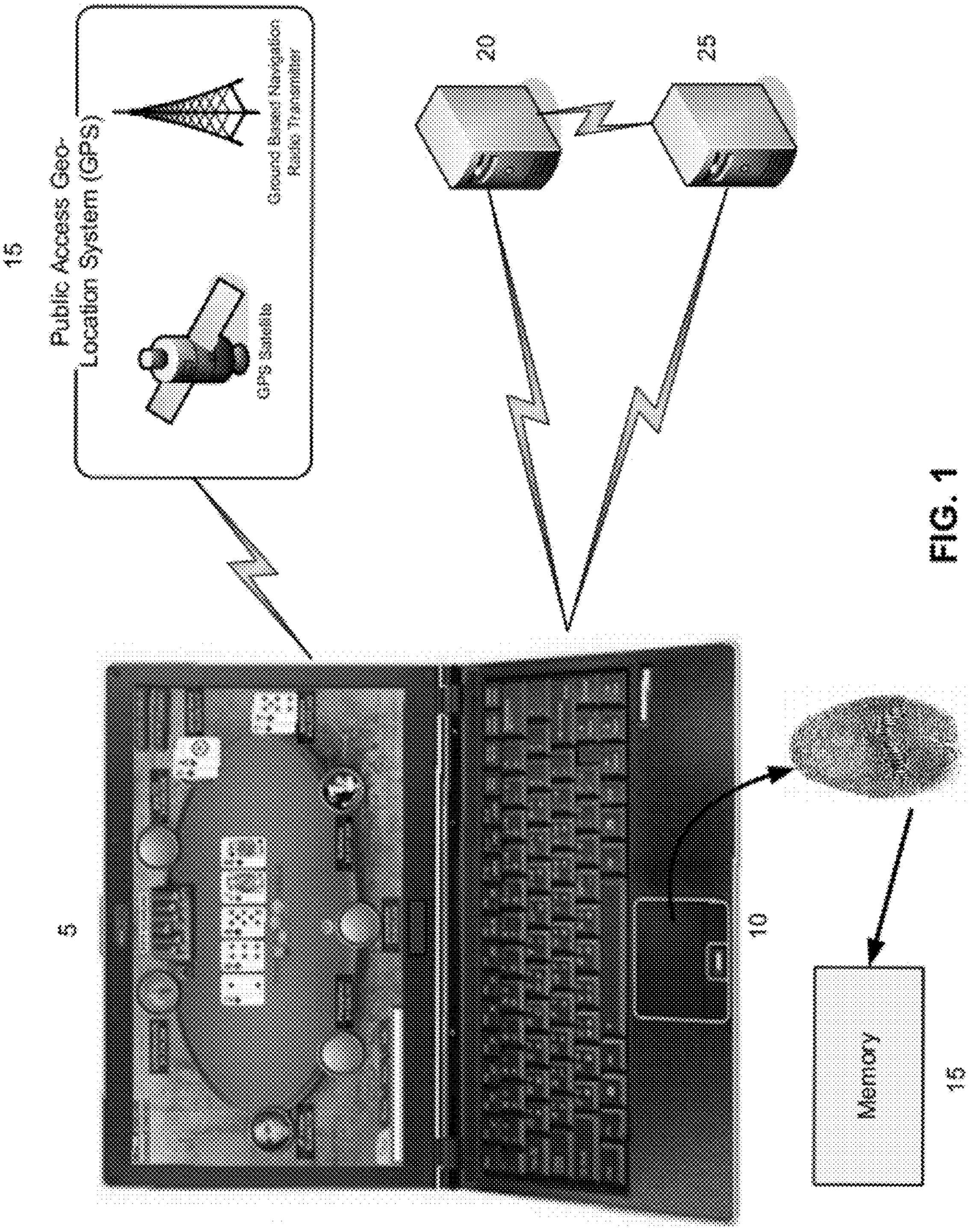
FIG. 1 illustrates an internet poker system constructed according to principles of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a server" is a reference to one or more server and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

The figures and flowcharts describe an embodiment of the invention that applies to the online version of poker. In this description, the term 'internet poker appliance' is a particular computing device with special features specific to poker in addition to the features of the invention. The combination of computer memory for storing the encrypted biometric reference, a control module containing the software that manages the storing and destruction of the encrypted biometric reference data, anti-tamper circuits and switches, and a power source for maintaining both memory and control module state is referred to as a 'suicide circuit'.

FIG. 1 shows one example of an internet poker appliance (5) according to aspects of the invention. As shown in FIG. 1, a tamper-resistant system may be provided for playing internet poker, including integrated geo-location and biometric player identification. In addition to the typical components found in state of the art computing devices, the internet poker appliance in this embodiment incorporates a biometric scanner fingerprint reader (10) and circuitry for receiving signals from satellite or terrestrial radio navigation transmitters (15). One or more independent third party identity management providers (20) confirm the identity of the poker appliance owner-user, manage the acquisition of the user's biometric reference data, and store and distribute the encryption keys required to encrypt and decrypt the biometric reference data. In embodiments, the biometric reference data may include biometric scan data, stored inside the computing device, against which all subsequent identity verification biometric scans may be compared. In embodiments, the internet poker website infrastructure (25) may be responsible for verifying the identity and location of the player both at log-in and during play, as well as providing/hosting the poker or other online activity.

As discussed further herein, internet poker appliance (5) may include 'suicide circuits' connected to all significant fasteners. For example, laminated sheets with integrated 'suicide circuit' conductors may be firmly affixed to the inside surfaces of major enclosure panels to prevent access to interior hardware by cutting. Any break in any circuit will cause a 'Suicide Circuit Controller' to erase biometric reference data stored in a volatile or non-volatile memory (15).

Figure 2:
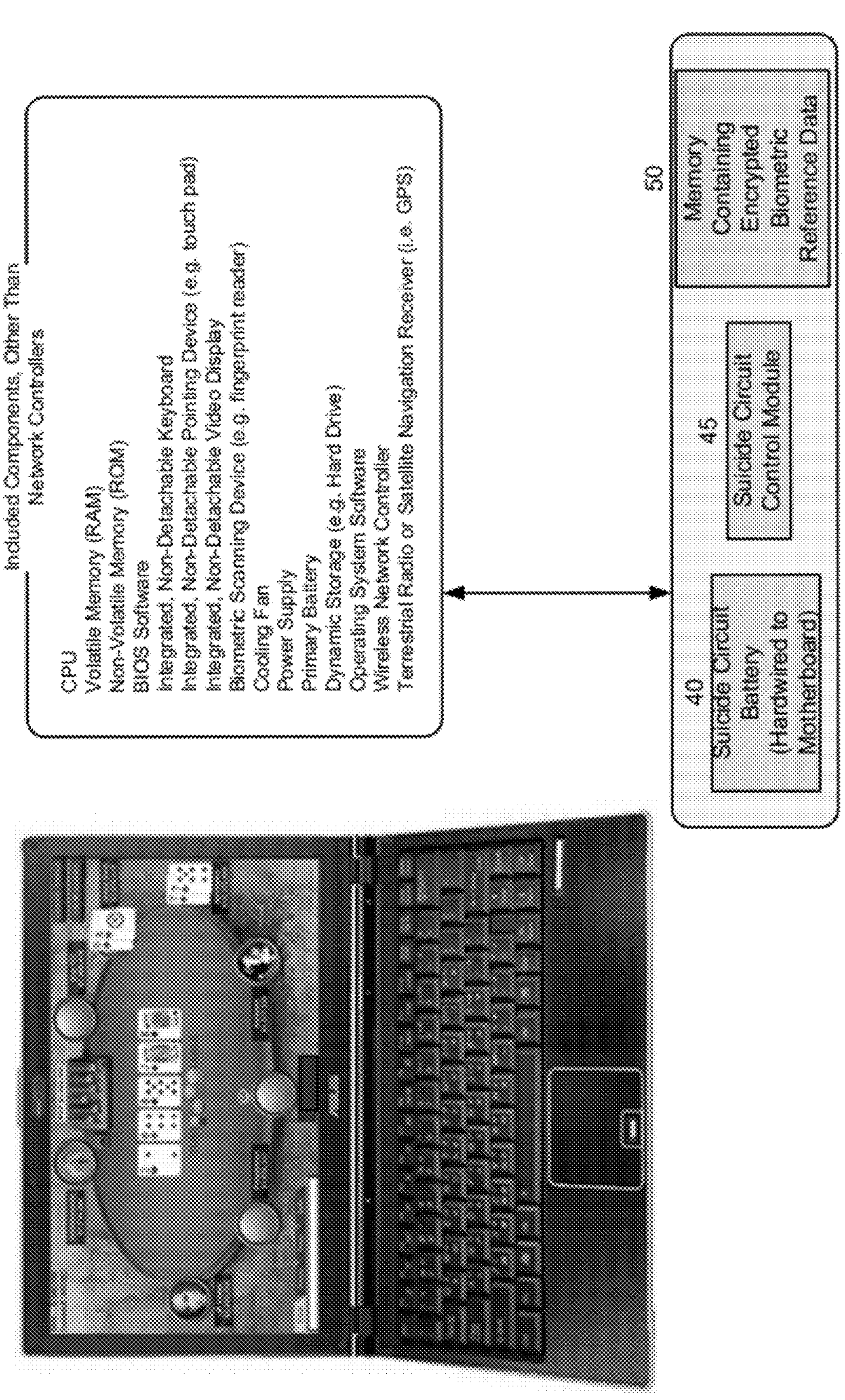
FIG. 2 illustrates an internet poker appliance constructed according to principles of the invention, where various components that may be included in the appliance.

FIG. 2 shows a schematic diagram including possible hardware and software components as may be included in internet poker appliance (5). As discussed herein, various of the listed components may be included within, and/or integrated with a tamper-proof or resistant case. In embodiments, exemplary user systems such as the internet poker appliance (5) may be precluded from including one or more of the following, USB ports, infrared ports, firewire ports, modems, video ports with input, additional communications ports of any kind, CD-RW, DVD-RW storage devices, memory device ports (e.g. flash memory cards), etc. to enhance the security of the system. Elimination of communications ports and other similar components found in conventional computing devices may help to ensure that a person cannot modify the device software or hardware.

As also shown in FIG. 2, features related to the function of internet poker appliance (5) that may be included in a tamper-proof casing (52), may include a battery (40) to power the suicide circuits and/or memory, a suicide circuit control module (45), and memory 50 for storing biometric reference data (50). One or more microprocessors and associated parts (not shown) may also be included in the casing 52. The battery (40) may be the main stored power source for the entire device or a separate battery dedicated to the maintenance of the suicide circuit components and/or memory. The suicide circuit control module (45) may contain software, firmware and/or hardware required to write new biometric data into memory (50) and to decide if stored biometric data should be destroyed in response to an attempt by a person to tamper with the device, the expiration of a specified time span, the battery power level dropping below a specified threshold, or any other criteria. The memory used to store the encrypted biometric reference data may be volatile or non-volatile but is dedicated to the single purpose of storing biometric data. In embodiments, data may be erased, for example, by positively directing a delete function, e.g. to non-volatile memory, or powering off volatile memory.

The internet poker appliance (5) may be configured, e.g. by hardware or firmware, to obtain biometric identification information of the user, for example, during a configuration of the system to the user, and/or during an initiation of an online activity. For example, the system may be configured such that a vendor selling the system assists in the creation of the user profile and corresponding biometric identification information, e.g. by providing necessary encryption keys etc. Thus, the system may be coded to a particular user when purchased, and may be prevented from being used by others.

A location module may also be provided in the internet poker appliance (5) that is configured to receive navigation signals broadcast from navigation transmitters, and/or to provide location information of the internet poker appliance (5). The location module may include, for example, a GPS receiver, GPS processing module, and/or GPS location transmitter. In embodiments, the processor is may be configured to periodically transmit location information of the internet poker appliance (5) with, or without biometric identification data, while the user is engaging in an online activity.

According to embodiments, the internet poker appliance (5) may include certain non-detachable components (i.e. components that are fixedly integrated with the casing and/or monitored for continuous connection by the tamper-detection module) such as a video screen, a keyboard, a cursor control device, the volatile and/or non-volatile memory, the central processing unit, a network controller, the navigation system, and/or the biometric scanning device.

Figure 3:
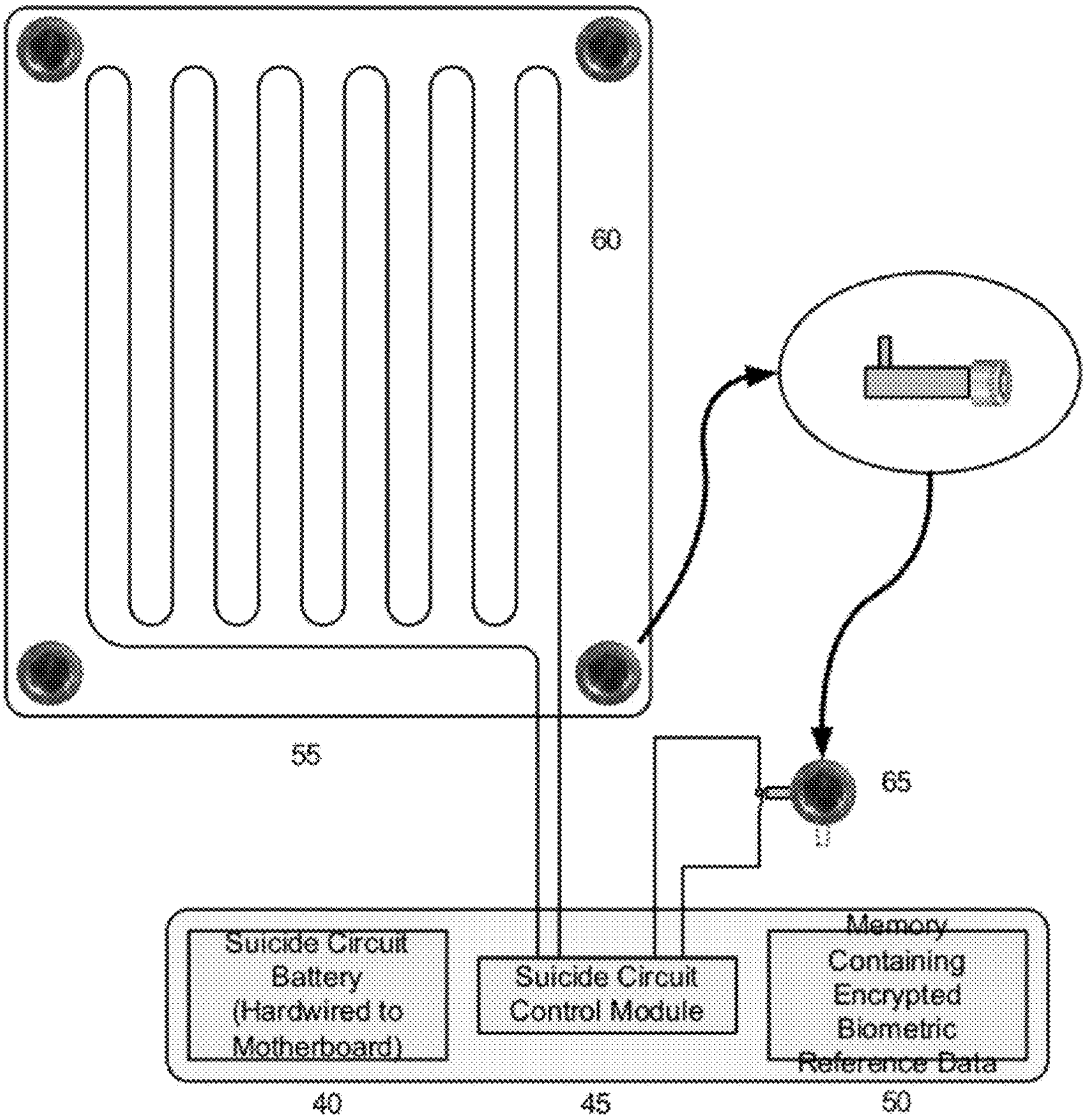
FIG. 3 illustrates an anti-tampering circuit for an internet poker appliance constructed according to principles of the invention.

FIG. 3 shows an exemplary anti-tamper systems that may be employed in an embodiment of the invention. In embodiments, electrical circuitry associated with an anti-tamper system may be connected to the suicide circuit control module (45). If an anti-tamper mechanism is breached, the suicide circuit control module (45) may receive notification of the event and in response, destroy the encrypted biometric reference data stored in the suicide circuit dedicated memory (50). One anti-tamper technique may involve electrical conductors attached in a wide-area pattern (60) to the inside of the computing device enclosure(s) (55). If a person or person using cutting devices or other tools attempts to cut through the enclosure, the electrical circuit formed by the conductors will be broken, thus indicating to the suicide circuit control module (45) that the biometric reference data should be destroyed. Switches attached to the internet poker appliance enclosure fasteners (65) are another possible anti-tamper mechanism connected to the suicide circuit control module (45). For example, the suicide circuit control module (45) may be configured such that, if any attempt is made to remove the fastener (65), a switch is opened and the biometric reference data, or other data stored in the memory, is deleted.

As one of skill in the art can appreciate, many other anti-tamper technologies and techniques may be employed that provide a signal to the suicide circuit control module (45) indicating the status of the anti-tamper system(s).

Explanation of Flowcharts

Figure 4:
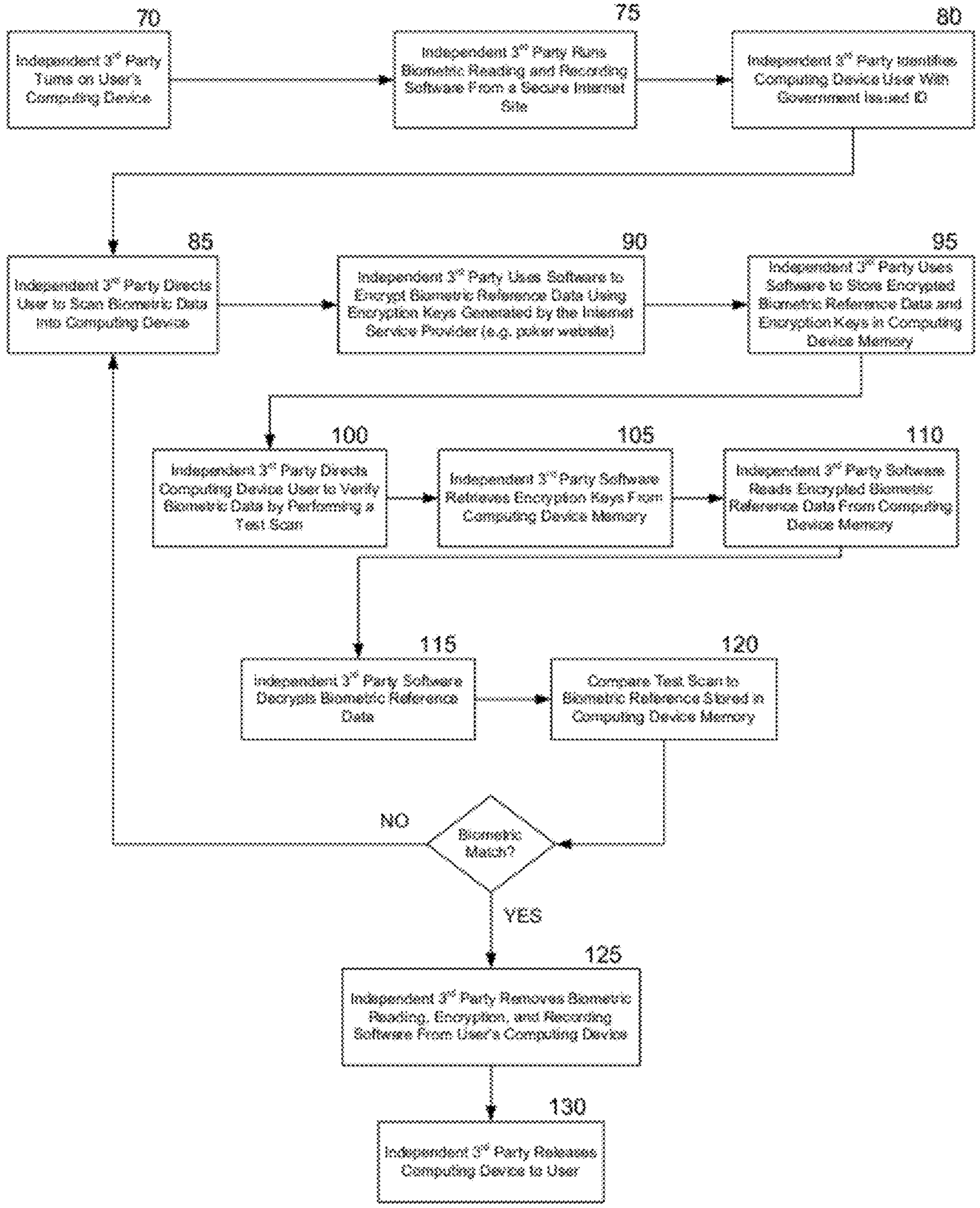
FIG. 4 is a flowchart illustrating a method for verifying a poker player identity according to principles of the invention.

FIG. 4 shows a process for an independent third party verifying the identity of the computing device user, acquiring the reference biometric data, and encrypting and storing the biometric reference data in the computing device suicide circuit memory. All steps in FIG. 4 may involve internet communication through a 'virtual private network' or VPN.

The term 'independent third party' refers to a company or person not affiliated in any way with the user-owner of the special computing device. An independent third party (ITP) may or may not be affiliated with the provider of a regulated internet service such as internet poker.

In the presence of the computing device user-owner, the ITP representative turns on the special computing device (70). The ITP representative then navigates to a website authorized by the special computing device operating system software. From the authorized website, the ITP representative downloads and launches software designed to acquire, encrypt, and store the user-owner's biometric reference data (75).

The ITP representative asks the device user-owner for proof of his or her identity. Proof may be any government-issued document such as a driver's license or passport. Using the proof document, the ITP representative verifies the user-owner's identity (80).

The ITP representative then directs the user-owner to scan his or her biometric reference data into the computing device using the scanning component built into the special computing device (85).

Using the software downloaded in step 75, the ITP encrypts the scanned biometric reference data using encryption keys generated by the provider of the regulated services or by another entity. It is understood that any encryption keys are stored outside the special computing device (90).

Once encrypted, the ITP software is used to write the encrypted biometric reference data and encryption keys into the memory controlled and monitored by the suicide circuit control module (95).

The ITP representative then directs the computing device user-owner to verify the encrypted and stored biometric reference data by performing a test scan which involves acquiring new biometric data for comparison to the encrypted and stored data (100).

The ITP software retrieves the encryption keys used to encrypt the biometric reference data from the regulated service provider (e.g. poker website) server the computing device memory (105).

The ITP software reads encrypted biometric reference data from the computing device memory (110).

Using the retrieved encryption key, the ITP software decrypts the biometric reference data (115).

The ITP software compares the test scan biometric data to the biometric reference data stored in the computing device memory (120).

If the two biometric data sets match, the ITP removes the biometric data scanning, encryption, and recording software from the user-owner's computing device (125) and returns the computing device to the user-owner (130).

If the biometric data sets do not match, the ITP repeats the process from either the initial scan (85) or the test scan (100) steps.

It should be appreciated that various encryption techniques may be used to support the concepts of the invention, and that such encryption techniques may involve providing, accessing, and/or storing encryption/decryption keys to and/or from various sources.

Figure 5:
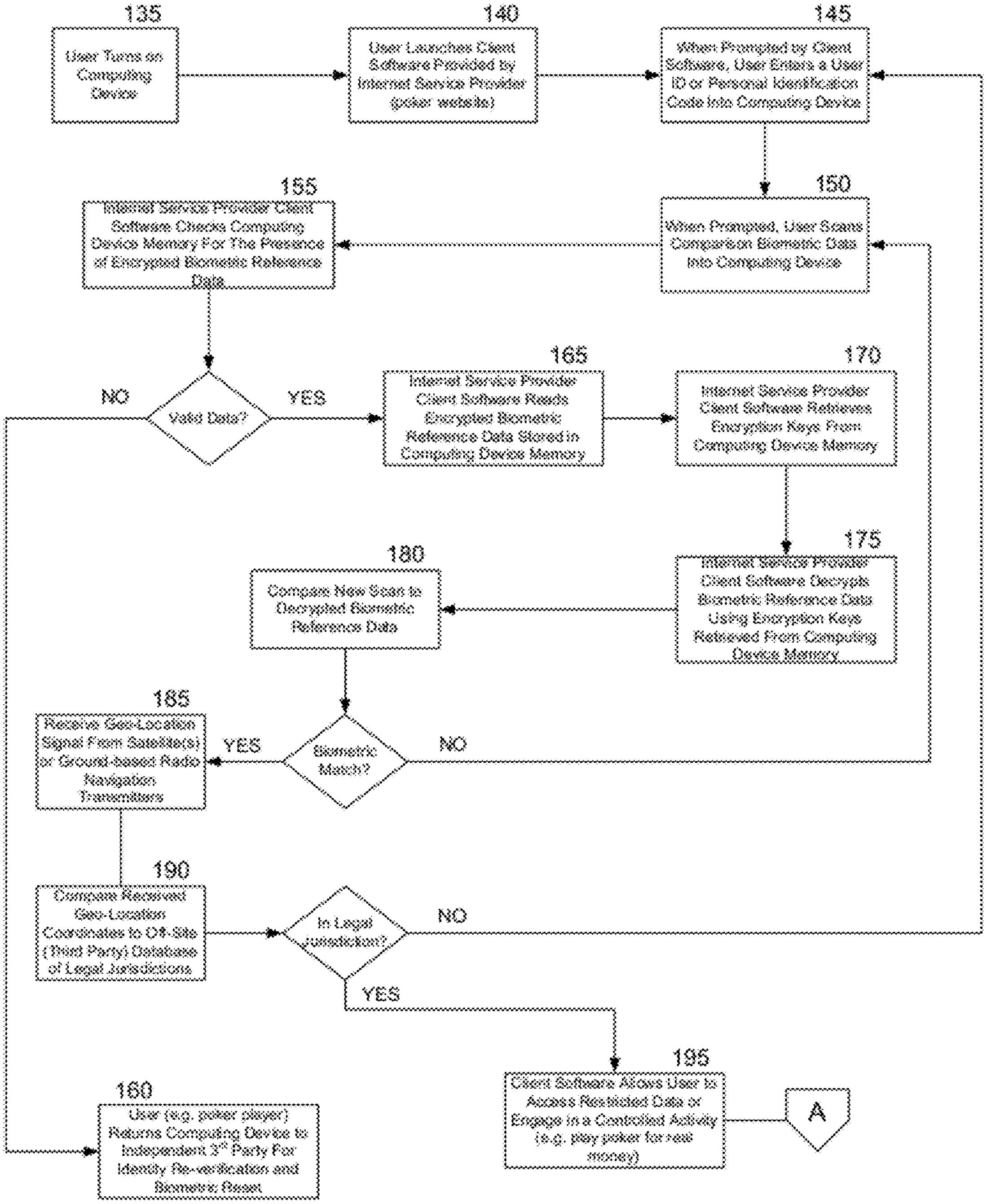
FIG. 5 is a flowchart illustrating a method for logging on to a poker appliance according to principles of the invention.

FIG. 5 shows a process for a computing device user-owner logging into client software offering controlled, restricted, or regulated functionality. The term 'internet service provider' refers to a business offering controlled, restricted, or regulated functionality through the internet and where the interface with the user-owner of the special computing device is software that runs on the special computing device. The client interface software may be hosted in an internet browser or may run within the computing device operating system.

To begin, the user-owner turns on the special computing device (135).

The user-owner then launches the client software provided by an internet service provider (e.g. poker website) offering controlled, restricted, or regulated functionality. (140).

When prompted by the client software, the user-owner enters a user ID, personal identification code, or other identification token Into the computing device (145).

When prompted, the user-owner scans his or her comparison biometric data into the computing device using the built-in biometric scanner component (150).

The internet service provider client software checks computing device (suicide circuit) memory for the presence of encrypted biometric reference data (155).

If no biometric reference data is detected, the user-owner must return the computing device to an independent third party for identity re-verification and restoration of the biometric reference data (160).

If valid biometric reference data is found, the internet service provider client software reads the encrypted biometric reference data stored in the computing device (suicide circuit) memory (165).

The internet service provider client software retrieves the encryption keys from the internet service provider data store or from the data store of a third party the computing device memory (170).

The internet service provider client software decrypts the biometric reference data using the encryption keys retrieved in step 170 (175).

The internet service provider client software compares the comparison scan from step 150 to the decrypted biometric reference data (180).

If the comparison biometric data does not match the reference data, the user-owner is returned to step 150.

If the comparison is successful, the internet service provider client software verifies the physical location of the special computing device.

The special computing device receives geo-location signals from satellite(s) or ground-based radio navigation transmitters (185).

The internet service provider client software compares geo-location coordinates received in step 185 to an off-site database of legal jurisdictions for the controlled, restricted, or regulated activity (190).

If the received geo-location coordinates are outside a legal jurisdiction where engaging in the controlled, restricted, or regulated activity is authorized, the user-owner is returned to step 145.

If the received geo-location coordinates are inside a legal jurisdiction where engaging in the controlled, restricted, or regulated activity is authorized, the user-owner is allowed by the internet service provider client software to access restricted data or engage in a controlled, restricted, or regulated activity (e.g. play poker for real money) (195).

Figure 6:
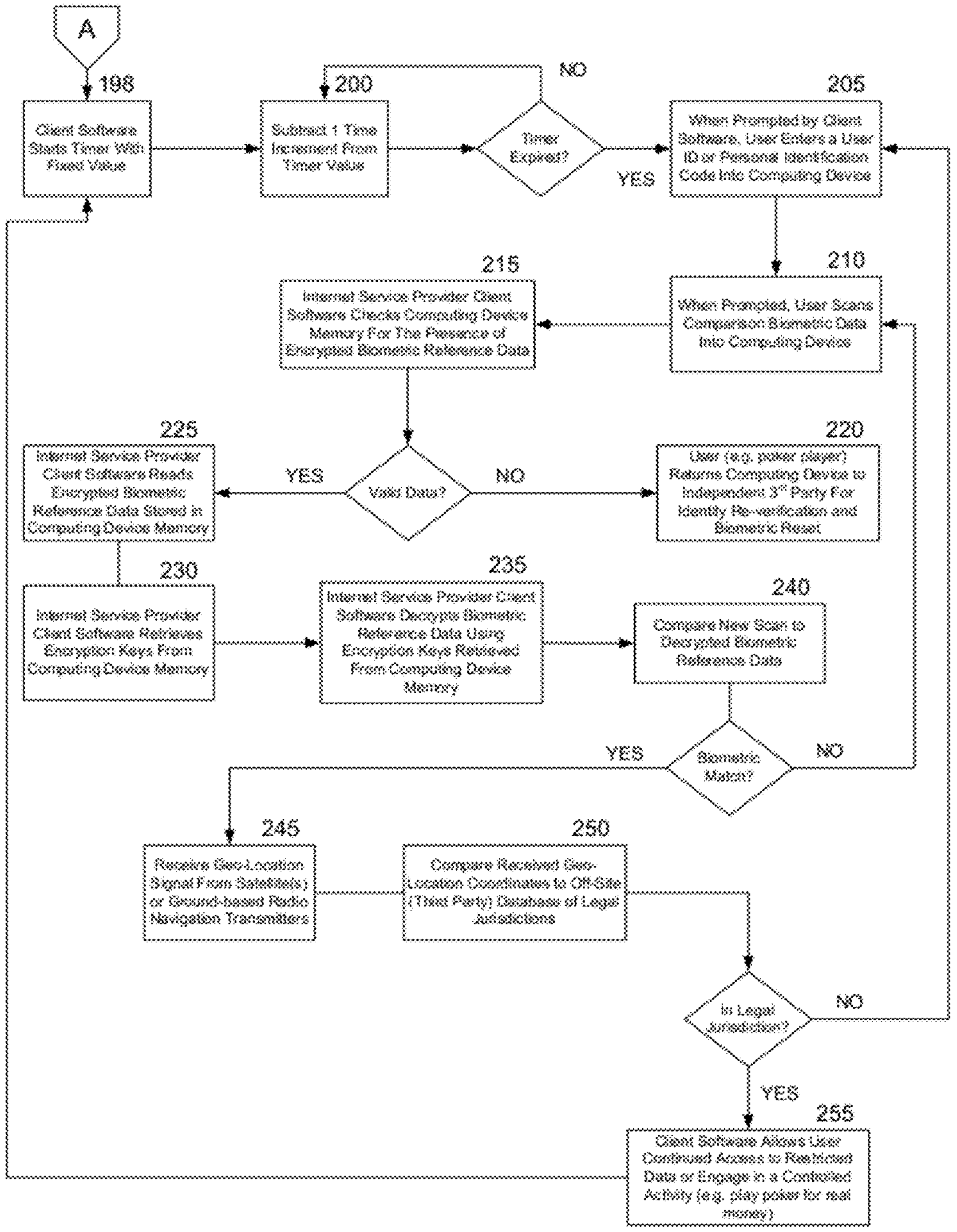
FIG. 6 is a flowchart illustrating a method for maintaining a logged on status according to principles of the invention.

FIG. 6 shows the process for a user-owner to remain logged into client software that allows the user-owner to engage in a controlled, restricted, or regulated activity.

When the user-owner begins using the client software, a timer is started by the client software with a fixed time duration value (198).

While the user-owner uses the client software, a time increment is subtracted from the timer value of step 198 (200).

The time decay loop of step 200 repeats until the fixed time duration of step 198 has expired.

Upon expiration, the client software prompts the user-owner to enter a user ID, personal identification code, or other identification token Into the computing device (205).

When prompted by the client software, the user-owner scans his or her comparison biometric data into the computing device using the built-in biometric scanner component (210).

The internet service provider client software checks computing device (suicide circuit) memory for the presence of encrypted biometric reference data (215).

If no biometric reference data is detected, the user-owner must return the computing device to an independent third party for identity re-verification and restoration of the biometric reference data (220).

If valid biometric reference data is found, the internet service provider client software reads the encrypted biometric reference data stored in the computing device (suicide circuit) memory (225).

The internet service provider client software retrieves the encryption keys from the internet service provider data store or from the data store of a third party the computing device memory (230).

The internet service provider client software decrypts the biometric reference data using the encryption keys retrieved in step 230 (235).

The internet service provider client software compares the comparison scan from step 210 to the decrypted biometric reference data (240).

If the comparison biometric data does not match the reference data, the user-owner is returned to step 210.

If the comparison is successful, the internet service provider client software verifies the physical location of the special computing device.

The special computing device receives geo-location signals from satellite(s) or ground-based radio navigation transmitters (245).

The internet service provider client software compares geo-location coordinates received in step 185 to an off-site database of legal jurisdictions for the controlled, restricted, or regulated activity (250).

If the received geo-location coordinates are outside a legal jurisdiction where engaging in the controlled, restricted, or regulated activity is authorized, the user-owner is returned to step 205.

If the received geo-location coordinates are inside a legal jurisdiction where engaging in the controlled, restricted, or regulated activity is authorized, the user-owner is allowed continued access to restricted data or continued ability to engage in a controlled, restricted, or regulated activity (e.g. play poker for real money) (255).

Figure 7:
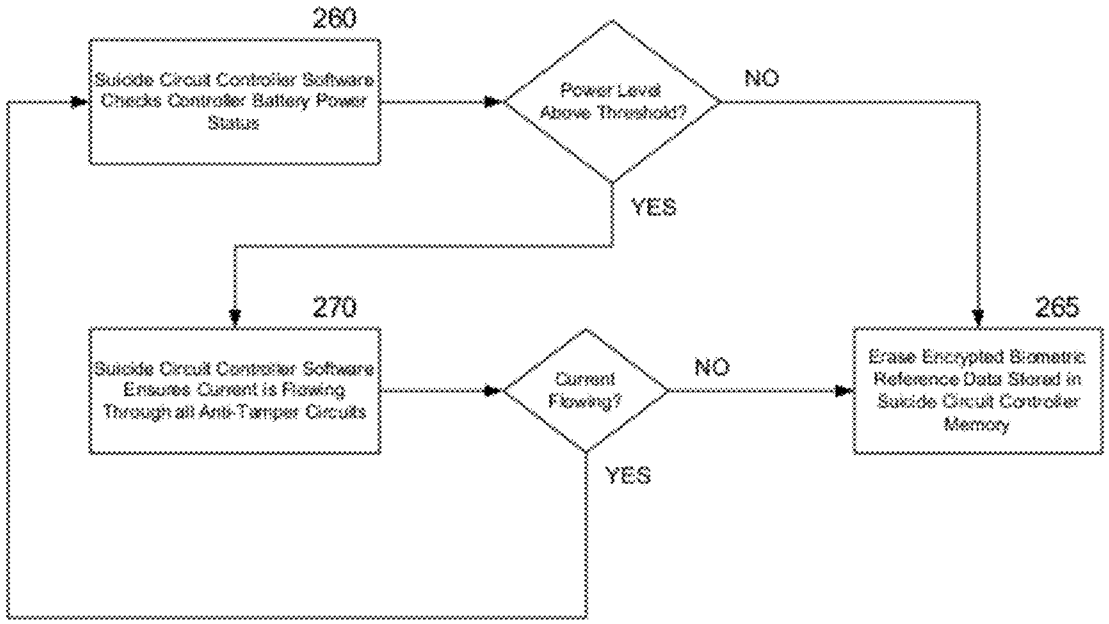
FIG. 7 is a flowchart illustrating a method for triggering a suicide circuit in a poker appliance according to principles of the invention.

FIG. 7 shows a process for the destruction of the biometric reference data by the suicide circuit control module.

The suicide circuit controller software checks the controller battery power level (260).

If the battery power level is above a predetermined threshold, the suicide circuit controller software ensures that current is flowing through all anti-tamper circuits (270).

If either the battery power level falls below the predetermined threshold or any anti-tamper circuit indicates zero current flow, the suicide circuit controller software will erase the encrypted biometric reference data stored in the suicide circuit controller memory (265). Such functionality may be provided in numerous ways known to those of skill in the art, depending on the type of memory used.

Embodiments of the present invention can include systems for implementing the described methods, as well as computer-readable storage medium coded with instructions for causing a computer to execute the described methods. For example, server systems including at least a processor, a memory and an electronic communication device, may be configured to receive, identify, respond to and/or act on a request, such as those described herein, received over a network, such as the Internet. Such servers may be operated by service providers including, for example, online casinos, government monitoring agencies and/or identity authenticators.

Requests to engage in online activities such as gambling may originate from, for example, a client device according to aspects of the invention, via various networks. Such networks may include any number of communication components including wired, cellular, satellite, optical and/or other similar communication links.

The networks can connect various wired, optical, electronic and other known networks to exchange information among, for example, servers, computers, mobile device(s), picocell network devices, mobile computer(s), and any other devices with similar functionality. The above-described devices and materials will be familiar to those of skill in the computer hardware and software arts and need not be individually or exhaustively depicted to be understood by those of skill in the art. The hardware elements described above may be configured to act as one or more modules for performing the operations described above.

In addition, embodiments of the present invention further include computer-readable storage media that include program instructions for performing various computer-implemented operations as described herein. Unless otherwise specified, the media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as flash drives, hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The description given above is merely illustrative and is not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments.

What is claimed is:

1. A computer-implemented method of providing a secure online user device, said method comprising:

establishing a network communication link with a service provider server;

providing computer instructions via the service provider server to a user device, the computer instructions configured to acquire, encrypt and store a user's biometric data on the user device as an encrypted version of the biometric reference data;

acquiring a user's biometric data using at least the computer instructions on the user device;

encrypting the user's biometric data using at least the computer instructions on the user device and an encryption key provided by the service provider server;

storing the encrypted version of the user's biometric data on the user device as biometric reference data;

reacquiring the user's biometric data via a test scan using a biometric scanner of the user device;

reacquiring the encryption key from the service provider server;

verifying that the biometric reference data is stored on the user device using at least the reacquired biometric data and the reacquired encryption key;

deleting said computer instructions based on the verification that the biometric reference data is stored on the user device;

receiving a request via the user device to begin a service to the user;

acquiring current biometric data of the user via the biometric scanner of the user device;

comparing by a computer processor the current biometric data of the user to the stored biometric reference data;

at least one of terminating by the computer processor the service if the current biometric data is not received after a predetermined period of time, or refusing the request if the current biometric data does not correspond to the stored biometric reference data.

2. The method of claim 1, wherein the service includes service that is legal within a specified geographic area.

3. The method of claim 1, wherein the service includes transferring funds between different users.

4. The method of claim 1, wherein the biometric reference data and the current biometric data periodically received while providing the service each include fingerprint data.

5. The method of claim 1, further comprising:

receiving current location information from the user device;

comparing the current location information to predetermined geographical areas in which the service may be legally provided before providing the service; and terminating by the computer processor the online service if the current location information changes to an area in which the online service is legally prohibited.

6. The method of claim 5, further comprising obtaining the predetermined geographical areas from a database that is separate from the provider of the service.

7. A computer-implemented method of providing a secure online service using identity confirmation, the online service provided by a service provider and the identity confirmation provided by a third party that is separate from the service provider, said method comprising:

providing computer instructions from the third art to a user device, the computer instructions configured to acquire and store a user's biometric data on the user device as biometric reference data;

verifying that the biometric reference data is stored on the user device;

deleting said computer instructions based on the verification that the biometric reference data is stored on the user device;

receiving at a secure Internet site of the third party via an electronic network a request to provide the online service by the service provider to the user device;

verifying by a computer processor that the biometric reference data is stored on the user device;

verifying by a computer processor that current biometric data obtained from a user matches the biometric reference data;

providing the online service to the user device based on the current biometric information matching the biometric reference data;

while providing the online service to the user, periodically verifying by a computer processor that current biometric data newly-obtained from the user still matches the biometric reference data stored on the user device; and terminating by the computer processor the online service if the current biometric data does not correspond to the biometric reference data stored on the user device, or if the current biometric data is not received after a predetermined period of time.

8. The method of claim 7, further comprising receiving current location information from the user, and comparing the location information to predetermined geographical areas in which the online service may legally be provided before providing the service.

9. The method of claim 7, wherein the online service includes transferring funds between different users.

10. The method of claim 7, further comprising:

providing computer instructions to the user device, the computer instructions configured encrypt the user's biometric data on the user device as an encrypted version of the biometric reference data;

encrypting the user's biometric data using at least the computer instructions on the user device and an encryption key provided by the service provider;

storing the encrypted version of the user's biometric data on the user device as the biometric reference data;

reacquiring the user's biometric data via a test scan using a biometric scanner of the user device;

reacquiring the encryption key from the service provider; and verifying that the biometric reference data is stored on the user device using at least the reacquired biometric data and the reacquired encryption key.

11. The method of claim 7, wherein the biometric reference data and the current biometric data periodically received while providing the online service each include fingerprint data.

12. The method of claim 8, further comprising terminating the online service if the current location information changes to an area in which the online service is legally prohibited.

13. The method of claim 8, further comprising obtaining the predetermined geographical areas from a database that is separate from the provider of the online service.

14. A method of providing a secure online user device, comprising:

running computer instructions at least partly from a secure Internet site managed by a third party, the computer instructions configured to acquire, encrypt and store a user's biometric data on a user device as biometric reference data;

acquiring a user's biometric data;

encrypting the user's biometric data using at least the computer instructions and an encryption key provided by the third party;

storing the biometric reference data on the user device such that the user is unable to change the biometric reference data without cooperation of the third party;

reacquiring the user's biometric data via a test scan using a biometric scanner of the user device;

reacquiring the encryption key from the third party;

verifying, via a processor on the user device, that the biometric reference data is stored on the user device using at least the reacquired biometric data and the reacquired encryption key;

deleting said computer instructions based on the verification that the biometric reference data is stored on the user device;

receiving at a secure Internet site managed by the third party a request to begin an online service via the user device;

acquiring current biometric data of the user via the user device;

comparing, by a computer processor, the current biometric data of the user to the stored biometric reference data;

at least one of granting the request if the current biometric data corresponds to the stored biometric reference data, or refusing the request if the current biometric data does not correspond to the stored biometric reference data.

15. The method of claim 14, wherein the biometric reference data is encrypted using a third parties' private key, such that a user of the device cannot change the biometric reference data without participation of the third party.

16. The method of claim 14, wherein the request to begin the online service is input to the user device, and the user device determines whether to grant or refuse the request.

17. The method of claim 15, wherein comparing the current biometric data of the user to the stored biometric reference data includes retrieving the private key from the third party.

* * * * *